United States Patent
Zhang et al.

(10) Patent No.: US 9,727,351 B2
(45) Date of Patent: Aug. 8, 2017

(54) METHOD AND DEVICE FOR SETTING STATUS OF APPLICATION

(71) Applicant: Xiaomi Inc., Beijing (CN)

(72) Inventors: Yang Zhang, Beijing (CN); Peng Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 89 days.

(21) Appl. No.: 14/144,744

(22) Filed: Dec. 31, 2013

(65) Prior Publication Data

US 2014/0304706 A1    Oct. 9, 2014

Related U.S. Application Data (63) Continuation of application No. PCT/CN2013/085931, filed on Oct. 25, 2013.

(30) Foreign Application Priority Data

Apr. 8, 2013    (CN) .......................... 2013 1 0119636

(51) Int. Cl.
G06F 9/46     (2006.01)
G06F 9/445    (2006.01)

(52) U.S. Cl.
CPC .................... G06F 9/445 (2013.01)

(58) Field of Classification Search
CPC ....................................................... G06F 9/445
USPC ........................................................ 718/100
See application file for complete search history.

(56) References Cited

U.S. PATENT DOCUMENTS

| | | | |
|---|---|---|---|
| 8,239,918 B1 | 8/2012 | Cohen | |
| 8,745,758 B2 * | 6/2014 | Cholas et al. | 726/29 |
| 8,863,232 B1 * | 10/2014 | Tidd | 726/2 |
| 2007/0016958 A1 * | 1/2007 | Bodepudi | G06F 21/6218 726/27 |
| 2010/0262953 A1 * | 10/2010 | Barboni | G06F 8/61 717/120 |
| 2010/0332600 A1 | 12/2010 | Narayan et al. | |
| 2011/0107436 A1 | 5/2011 | Cholas et al. | |
| 2011/0167259 A1 | 7/2011 | Fanton et al. | |
| 2012/0054625 A1 * | 3/2012 | Pugh et al. | 715/736 |
| 2012/0090033 A1 * | 4/2012 | Kelly et al. | 726/26 |
| 2012/0180071 A1 | 7/2012 | Lesandro et al. | |
| 2012/0210265 A1 * | 8/2012 | Delia et al. | 715/771 |

(Continued)

FOREIGN PATENT DOCUMENTS

| | | |
|---|---|---|
| CN | 101001167 | 7/2007 |
| CN | 101237290 | 8/2008 |

(Continued)

OTHER PUBLICATIONS

Extended Search Report for European Application No. EP 13881891.9 from the European Patent Office, dated Nov. 2, 2016.

*Primary Examiner* — Timothy A Mudrick
(74) *Attorney, Agent, or Firm* — Finnegan, Henderson, Farabow, Garrett & Dunner LLP (57) ABSTRACT

A method for a device to set a status of an application, including: acquiring status setting permission information of the application; determining if the acquired status setting permission information indicates that it is permitted to set the status of the application; and setting the status of the application as an inactive status, if it is determined that the acquired status setting permission information indicates that it is permitted to set the status of the application.

15 Claims, 6 Drawing Sheets

(56) References Cited

U.S. PATENT DOCUMENTS

2013/0055378 A1    2/2013   Chang et al.
2013/0132713 A1*   5/2013   Kokubun .......................... 713/2
2014/0096246 A1*   4/2014   Morrissey et al. ............. 726/23

FOREIGN PATENT DOCUMENTS

| CN | 101395894 A | 3/2009 |
|----|----|----|
| CN | 101923609 | 12/2010 |
| CN | 101923609 A | 12/2010 |
| CN | 102711098 A | 10/2012 |
| CN | 102981906 A | 3/2013 |
| CN | 103226491 | 7/2013 |
| EP | 1993273 A1 | 11/2008 |
| JP | 2004343611 A | 12/2004 |
| JP | 2009118536 A | 5/2009 |
| RU | 2450351 C1 | 5/2012 |
| WO | WO 2012/109512 A1 | 8/2012 |
| WO | WO 2013/065274 A1 | 5/2013 |

* cited by examiner

METHOD AND DEVICE FOR SETTING STATUS OF APPLICATION

CROSS-REFERENCE TO RELATED APPLICATIONS

This application is a continuation of International Application No. PCT/CN2013/085931, filed Oct. 25, 2013, which is based upon and claims priority to Chinese Patent Application No. 201310119636.3, filed Apr. 8, 2013, the entire contents of all of which are incorporated herein by reference.

TECHNICAL FIELD

The present disclosure generally relates to the field of computer technology and, more particularly, to a method and a device for setting a status of an application.

BACKGROUND

Conventionally, interactive communication is used between an operating system and an application or between applications, utilizing a cross-process communication technique. For example, system broadcast is a non-targeted inter-process communication provided by an operating system, such as the Android operating system, in which a broadcast message is sent by the operating system or an application to applications not specifically designated, at a time a specific event occurs. Also for example, the Android operating system can broadcast a message BOOT_COMPLETE at the time a boot process has been completed, and broadcast a message CONNECTIVITY_CHANGE at the time a network is changed.

An application generally has an inactive status, also known as a stop status, after an installation process on a device is complete. When a user starts the application, the status of the application is changed into an active status, also known as a non-stop status. Typically, broadcast messages are only directed to applications in an active status. Neither a normal exit of the application nor a restart of the operating system can change the application from the active status to the inactive status.

Accordingly, once a broadcast message is sent, all applications in the active status may receive the broadcast message, and may also be self-started, which increases power consumption of the device and a risk of leakage of user information resulting from certain applications being self-restarted.

SUMMARY

According to a first aspect of the present disclosure, there is provided a method for a device to set a status of an application, comprising: acquiring status setting permission information of the application; determining if the acquired status setting permission information indicates that it is permitted to set the status of the application; and setting the status of the application as an inactive status, if it is determined that the acquired status setting permission information indicates that it is permitted to set the status of the application.

According to a second aspect of the present disclosure, there is provided a device for setting a status of an application, comprising: a processor; and a memory for storing instructions executable by the processor; wherein the processor is configured to: acquire status setting permission information of the application; determine if the acquired status setting permission information indicates that it is permitted to set the status of the application; and set the status of the application as an inactive status, if it is determined that the acquired status setting permission information indicates that it is permitted to set the status of the application.

According to a third aspect of the present disclosure, there is provided a non-transitory computer-readable medium having stored therein instructions that, when executed by a processor of a device, cause the device to perform a method for setting a status of an application, the method comprising: acquiring status setting permission information of the application; determining if the acquired status setting permission information indicates that it is permitted to set the status of the application; and setting the status of the application as an inactive status, if it is determined that the acquired status setting permission information indicates that it is permitted to set the status of the application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
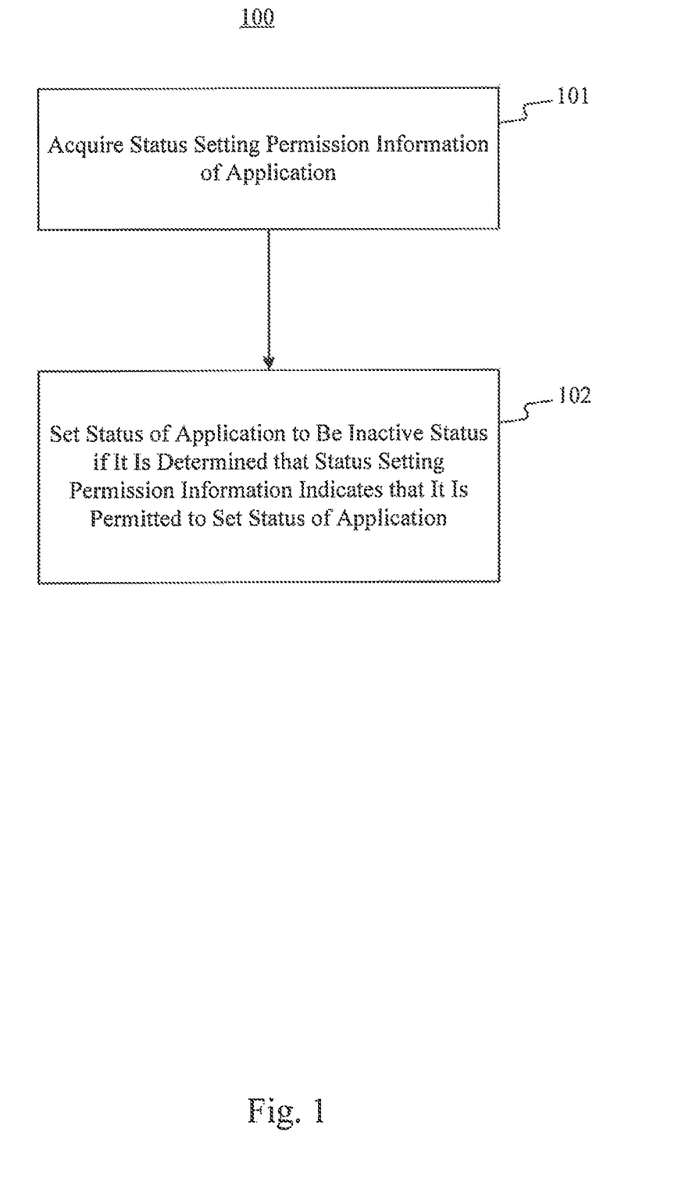
FIG. 1 is a flowchart of a method for a device to set a status of an application, according to an exemplary embodiment.

FIG. 1 is a flowchart of a method 100 for a device to set a status of an application, according to an exemplary embodiment. For example, the device may be a desktop computer, a tablet computer, a mobile phone, etc. Referring to FIG. 1, the method 100 includes the following steps.

In step 101, the device acquires status setting permission information of the application. In step 102, the device determines if the status setting permission information indicates that it is permitted to set the status of the application, and sets the status of the application to be an inactive status if it is determined that the status setting permission information indicates that it is permitted to set the status of the application.

Accordingly, the application is disabled from receiving broadcast messages. Hence, a number of applications that can receive broadcast messages may be effectively restrained. As a result, power consumption caused by the applications receiving broadcast messages is reduced, and a risk of leakage of user information resulting from self-restart of the applications after receiving broadcast messages is also reduced.

In exemplary embodiments, the device stores application information corresponding to each application in the form of a data package. In one exemplary embodiment, the device uses the Android operating system. Accordingly, the device stores application information corresponding to each application in PackageManager, a component that manages all applications in the Android operating system, in the form of a data package. For example, the application information corresponding to each application includes an identification of the application, a storage path of the application, a use permission of the application and the like.

In exemplary embodiments, the device adds a setting field to the application information corresponding to each application in advance, to store the status setting permission information of the application.

Figure 2:
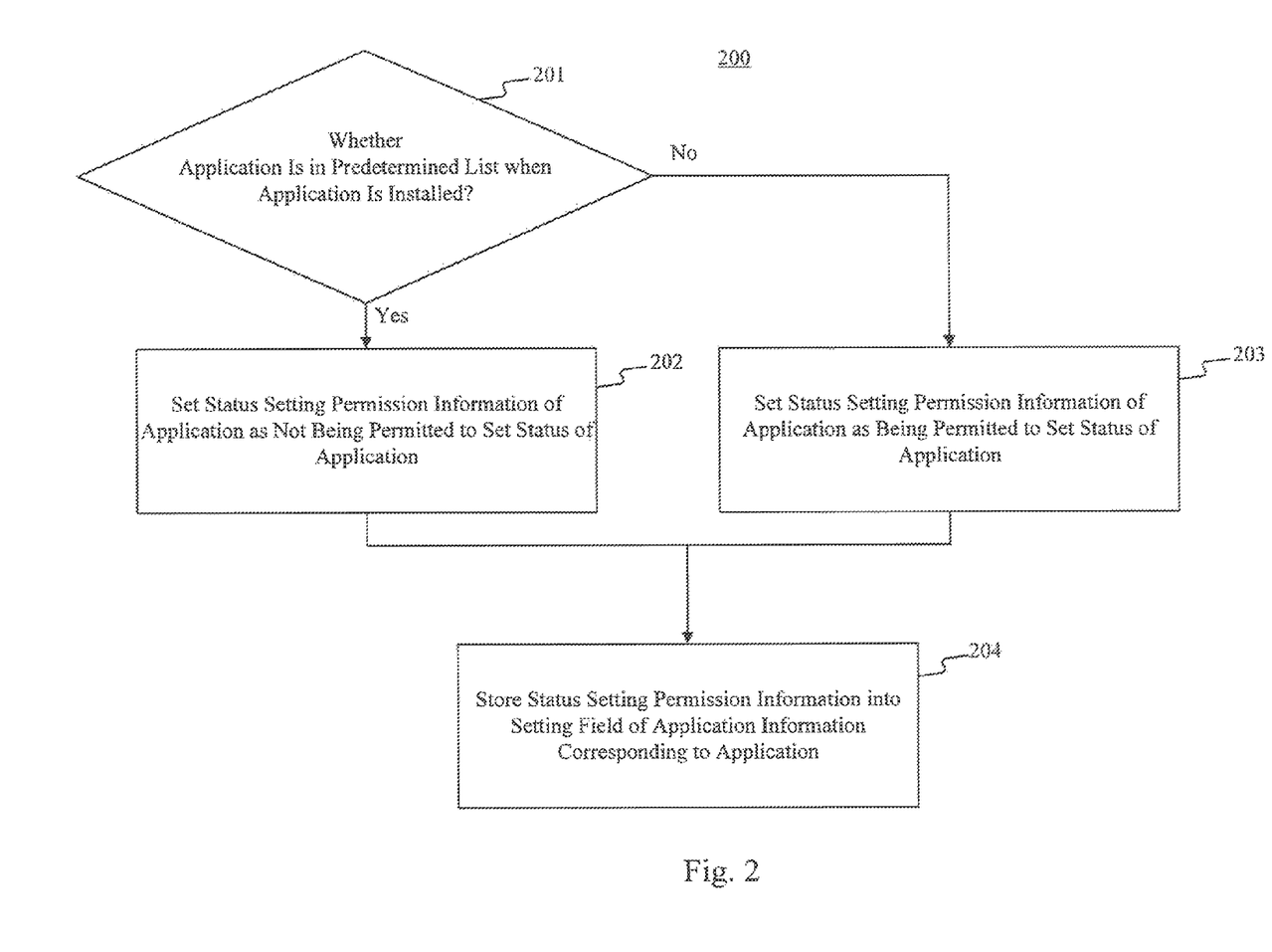
FIG. 2 is a flowchart of a method for a device to set status setting permission information, according to an exemplary embodiment.

FIG. 2 is a flowchart of a method 200 for the device to set status setting permission information, according to an exemplary embodiment. Referring to FIG. 2, the method 200 includes the following steps.

In step 201, the device determines whether the application is in a predetermined list of applications at the time the application is installed on the device and, if so, the device performs step 202; otherwise, the device performs step 203.

In exemplary embodiments, the predetermined list includes information regarding applications that need to be run in background. That is, the applications in the predetermined list need to be in an active status when the device is turned on, and the status of each of those applications is not permitted to be changed. For example, the predetermined list is a list of identifications of the applications running in background.

In one exemplary embodiment, to determine whether an installed application belongs to the predetermined list, the device checks an identification of the installed application to determine whether the identification of the installed application matches an identification of any listed application in the predetermined list. If the device determines that there is a match, the device determines that a status of the installed application is not permitted to be set; and if the device determines no match, the device determines that the status of the installed application is permitted to be set.

In step 202, the device sets the status setting permission information of the application as not being permitted to set the status of the application, and performs step 204. In exemplary embodiments, the status setting permission information may be a number, a word and the like. For example, the status setting permission information may be the number "0" or the word "false", to indicate that it is not permitted to set the status of the application.

In step 203, the device sets the status setting permission information of the application as being permitted to set the status of the application. As noted above, the status setting permission information may be a number, a word and the like. For example, the status setting permission information may be the number "1" or the word of "true", to indicate that it is permitted to set the status of the application.

In step 204, the device stores the status setting permission information into a setting field of the application information corresponding to the application.

In exemplary embodiments, the device provides an interface for configuring the setting field by an upper layer application, to set the status setting permission information according to instructions from a user. For example, the user may input configuring information with respect to an installed application through the upper layer application. The configuring information indicates whether it is permitted to set the status of the installed application. Accordingly, the device sets the status setting permission information of the installed application according to the configuring information.

Figure 3:
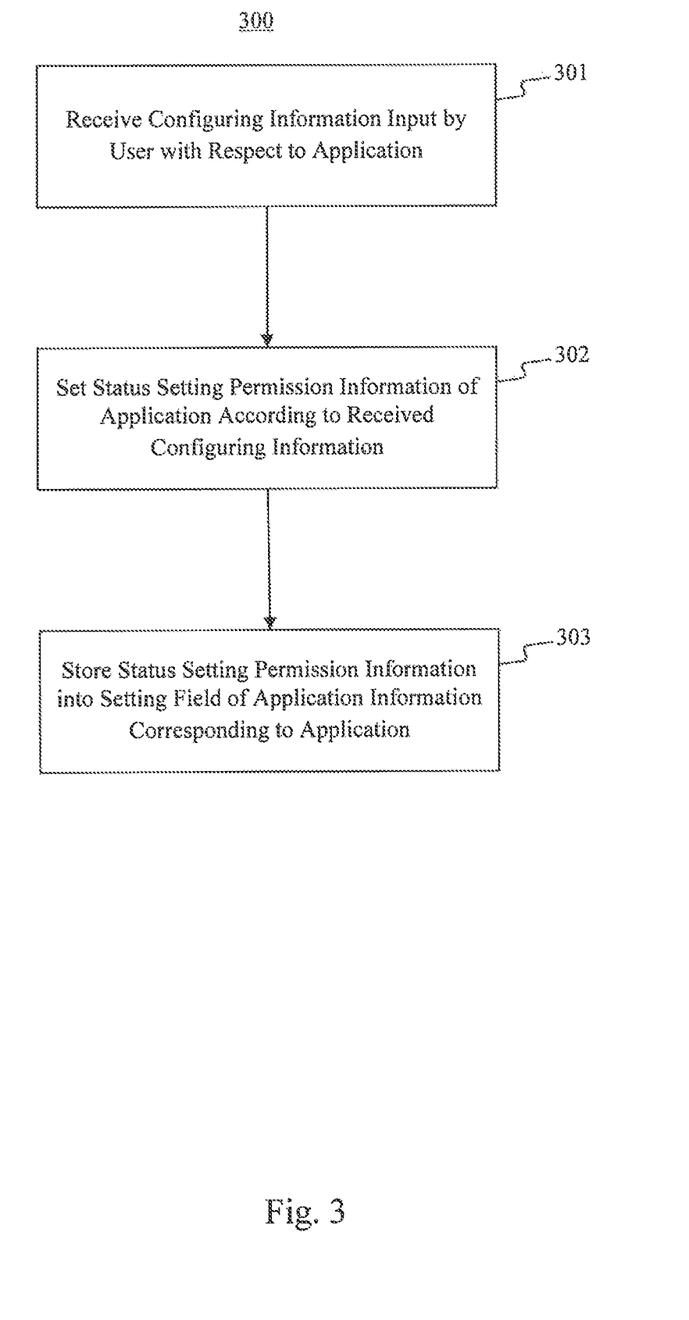
FIG. 3 is a flowchart of a method for a device to set status setting permission information, according to an exemplary embodiment.

FIG. 3 is a flowchart of a method 300 for the device to set status setting permission information, according to an exemplary embodiment. Referring to FIG. 3, the method 300 includes the following steps.

In step 301, the device receives configuring information input by a user with respect to an application. The configuring information indicates whether it is permitted to set the status of the application.

In step 302, the device sets the status setting permission information of the application according to the received configuring information.

In step 303, the device stores the status setting permission information into a setting field of the application information corresponding to the application.

Figure 4:
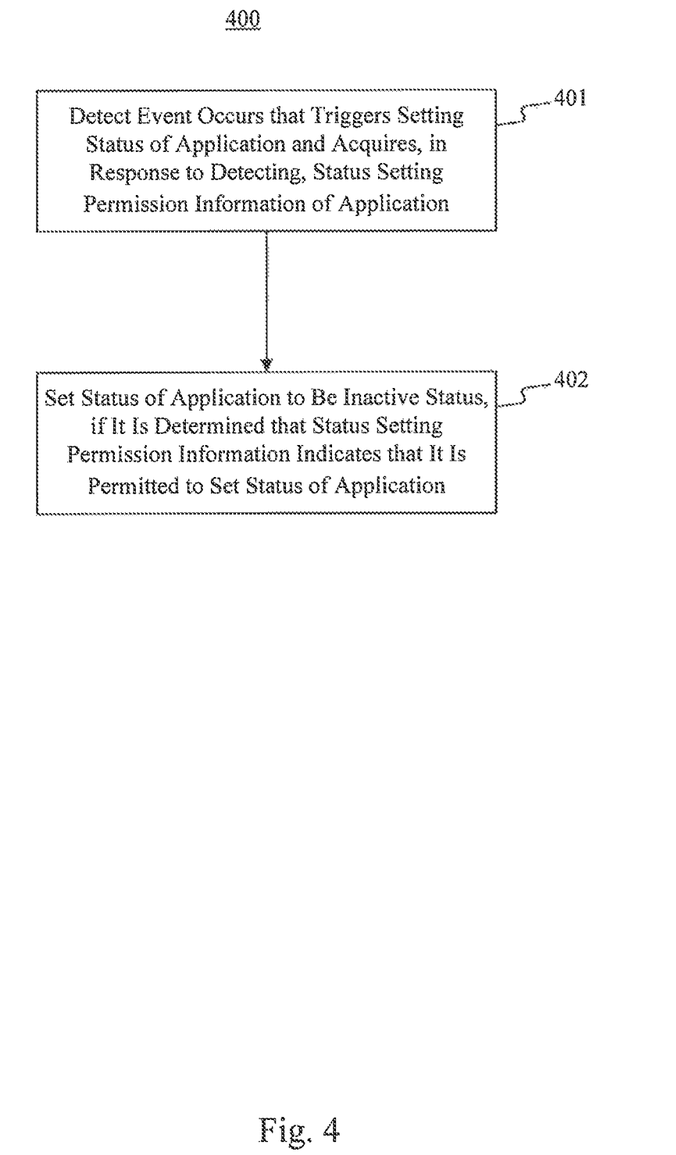
FIG. 4 is a flowchart of a method for a device to set a status of an application, according an exemplary embodiment.

FIG. 4 is a flowchart of a method 400 for the device to set a status of an application, according to an exemplary embodiment. Referring to FIG. 4, the method 400 includes the following steps.

In step 401, the device detects an event occurs that triggers setting the status of the application and acquires, in response to the detecting, status setting permission information of the application. For example, the device acquires application information corresponding to the application, and extracts the status setting permission information from a setting field of the application information. Also for example, the event that triggers setting the status of the application may be restarting the device, cleaning a memory of the device, or locking a screen of the device.

In step 402, the device determines if the status setting permission information indicates that it is not permitted to set the status of the application, and does not set the status of the application if it is determined that the status setting permission information indicates that it is not permitted to set the status of the application; and sets the status of the application to be an inactive status, if it is determined that the status setting permission information indicates that it is permitted to set the status of the application.

In one exemplary embodiment, the application is currently in an active status. Accordingly, the device sets the status of the application by changing the status into an inactive status. In one exemplary embodiment, the application is currently in an inactive status. Accordingly, the device sets the status of the application by maintaining the inactive status. As a result, the application with the inactive status will not receive broadcast messages.

In the method 400, the application is disabled from receiving broadcast messages. Hence, a number of applications that can receive broadcast messages may be effectively restrained. As a result, power consumption caused by the applications receiving broadcast messages is decreased, and a risk of leakage of user information resulting from self-restart of the applications after receiving broadcast messages is decreased.

Figure 5:
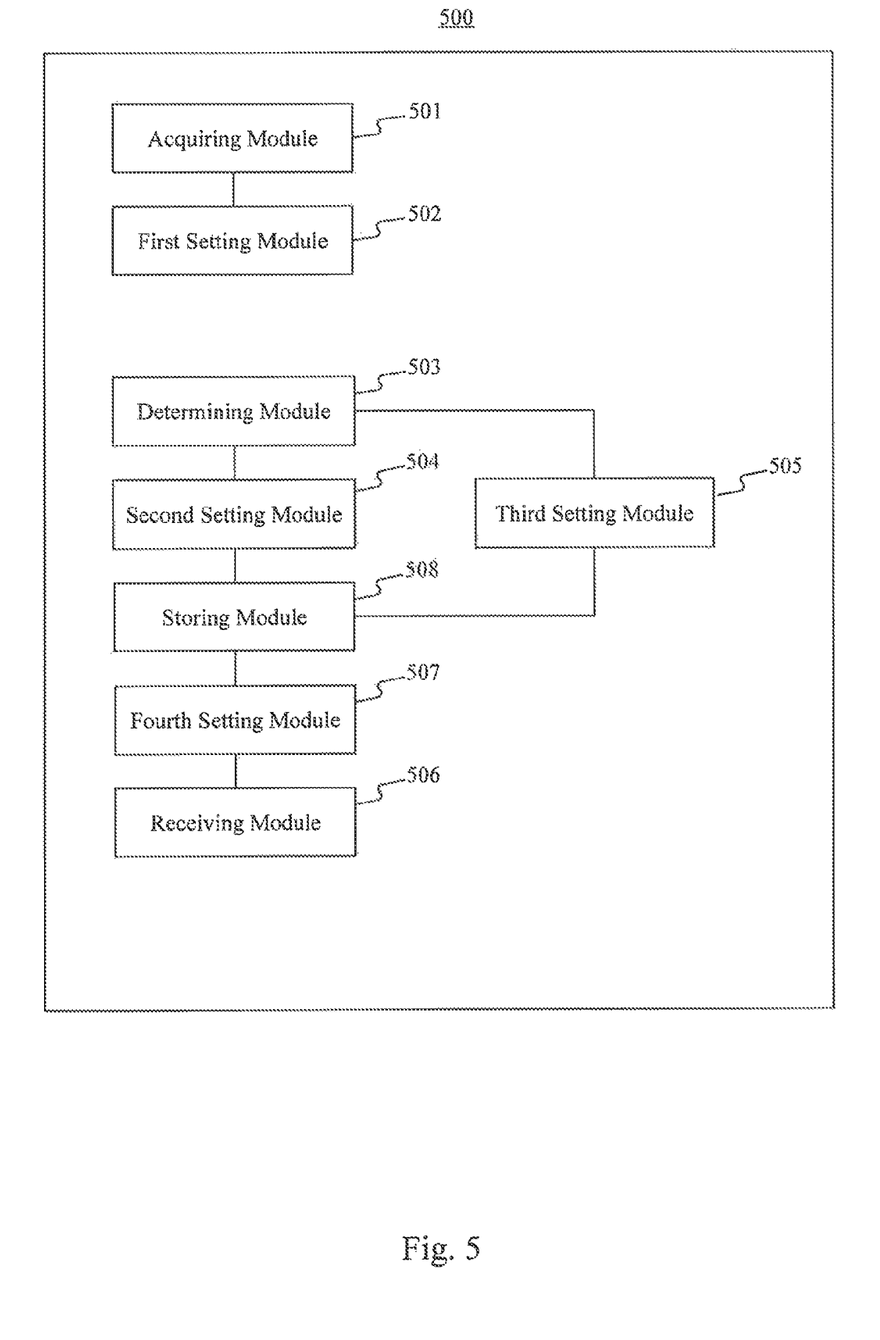
FIG. 5 illustrates a block diagram of a device for setting a status of an application, according to an exemplary embodiment.

FIG. 5 illustrates a block diagram of a device 500 for setting a status of an application, according to an exemplary embodiment. Referring to FIG. 5, the device 500 includes an acquiring module 501 and a first setting module 502.

In exemplary embodiments, the acquiring module 501 is configured to acquire status setting permission information of an application, and the first setting module 502 is configured to set the status of the application to be an inactive status if the status setting permission information indicates that it is permitted to set the status of the application. For example, the acquiring module 501 is configured to acquire the status setting permission information of the application, in response to detecting an event occurs that triggers setting the status of the application.

In exemplary embodiments, the device 500 further includes a determining module 503, a second setting module 504, and a third setting module 505. The determining module 503 is configured to determine whether the application is in a predetermined list at the time the application is installed, the predetermined list including one or more applications that need to be run in background. The second setting module 504 is configured to set the status setting permission information of the application as not being permitted to set the status of the application, if it is determined that the application is in the predetermined list. The third setting module 505 is configured to set the status setting permission information of the application as being permitted to set the status of the application, if it is determined that the application is not in the predetermined list.

In exemplary embodiments, the device 500 further includes a receiving module 506 and a fourth setting module 507. The receiving module 506 is configured to receive configuring information with respect to the application input by a user, the configuring information indicating whether it is permitted to set the status of the application. The fourth setting module 507 is configured to set the status setting permission information of the application according to the configuring information.

In exemplary embodiments, the device 500 further includes a storing module 508 configured to store the status setting permission information into a setting field of application information corresponding to the application.

Figure 6:
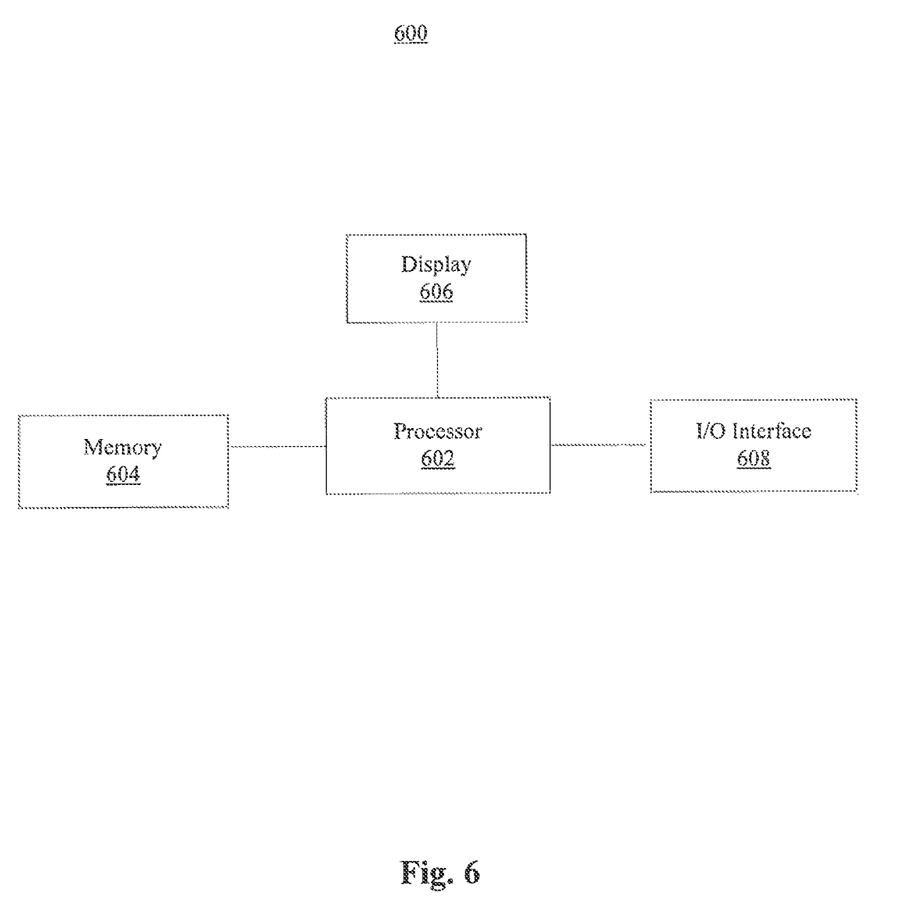
FIG. 6 illustrates a block diagram of a device for setting a status of an application, according to an exemplary embodiment.

FIG. 6 illustrates a block diagram of a device 600 for setting a status of an application, according to an exemplary embodiment. For example, the device 600 may be a desktop computer, a tablet computer, a mobile phone, etc. Referring to FIG. 6, the device 600 includes a processor 602 configured to execute program instructions to perform the above described methods, a memory 604 configured to store information, such as status setting permission information, a predetermined list of applications that need to run in background, and program instructions, a display 606 for displaying related information for setting a status of an application, and an input/output (I/O) interface 608 for receiving user input.

In an exemplary embodiment, there is also provided a non-transitory computer-readable medium including instructions, such as included in the memory 604, executable by the processor 602 in the device 600, for performing the above described methods for setting a status of an application.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to set a status of an application, wherein the application has an inactive status after an installation process of the application on the device is complete, and changes from the inactive status to an active status when a user starts the application, the method comprising:
   detecting occurrence of one of restarting the device, cleaning a memory of the device, or locking a screen of the device;
   acquiring, in response to the detecting, status setting permission information of the application;
   determining if the acquired status setting permission information indicates that it is permitted to set the status of the application; and
   setting, without receiving a user input, the status of the application to the inactive status in which the application is disabled from receiving broadcast messages sent by an operating system in the device, if it is determined that the acquired status setting permission information indicates that it is permitted to set the status of the application.

2. The method according to claim 1, further comprising:
   determining whether the application is in a predetermined list at a time the application is installed, the predetermined list including one or more applications that need to be run in background;
   setting the status setting permission information of the application as not being permitted to set the status of the application, if it is determined that the application is in the predetermined list; and
   setting the status setting permission information of the application as being permitted to set the status of the application, if it is determined that the application is not in the predetermined list.

3. The method according to claim 2, further comprising:
   storing the status setting permission information of the application into a setting field of application information corresponding to the application.

4. The method according to claim 1, further comprising:
receiving configuring information with respect to the application, the configuring information indicating whether it is permitted to set the status of the application; and
setting the status setting permission information of the application according to the received configuring information.

5. The method according to claim 4, further comprising:
storing the status setting permission information of the application into a setting field of application information corresponding to the application.

6. A device for setting a status of an application, wherein the application has an inactive status after an installation process of the application on the device is complete, and changes from the inactive status to an active status when a user starts the application, the device comprising:
a processor; and
a memory for storing instructions executable by the processor;
wherein the processor is configured to:
detect occurrence of one of restarting the device, cleaning the memory of the device, or locking a screen of the device;
acquire, in response to the detecting, status setting permission information of the application;
determine if the acquired status setting permission information indicates that it is permitted to set the status of the application; and
set, without receiving a user input, the status of the application to the inactive status in which the application is disabled from receiving broadcast messages sent by an operating system in the device, if it is determined that the acquired status setting permission information indicates that it is permitted to set the status of the application.

7. The device of claim 6, the processor being further configured to:
determine whether the application is in a predetermined list at a time the application is installed, the predetermined list including one or more applications that need to be run in background;
set the status setting permission information of the application as not being permitted to set the status of the application, if it is determined that the application is in the predetermined list; and
set the status setting permission information of the application as being permitted to set the status of the application, if it is determined that the application is not in the predetermined list.

8. The device of claim 7, the processor being further configured to:
store the status setting permission information of the application into a setting field of application information corresponding to the application.

9. The device of claim 6, the processor being further configured to:
receive configuring information with respect to the application, the configuring information indicating whether it is permitted to set the status of the application; and
set the status setting permission information of the application according to the received configuring information.

10. The device of claim 9, the processor being further configured to:
store the status setting permission information of the application into a setting field of application information corresponding to the application.

11. A non-transitory computer-readable medium having stored therein instructions that, when executed by a processor of a device, cause the device to perform a method for setting a status of an application, wherein the application has an inactive status after an installation process of the application on the device is complete, and changes from the inactive status to an active status when a user starts the application, the method comprising:
detecting occurrence of one of restarting the device, cleaning a memory of the device, or locking a screen of the device;
acquiring, in response to the detecting, status setting permission information of the application;
determining if the acquired status setting permission information indicates that it is permitted to set the status of the application; and
setting, without receiving a user input, the status of the application to the inactive status in which the application is disabled from receiving broadcast messages sent by an operating system in the device, if it is determined that the acquired status setting permission information indicates that it is permitted to set the status of the application.

12. The non-transitory computer-readable medium according to claim 11, the method further comprising:
determining whether the application is in a predetermined list at a time the application is installed, the predetermined list including one or more applications that need to be run in background;
setting the status setting permission information of the application as not being permitted to set the status of the application, if it is determined that the application is in the predetermined list; and
setting the status setting permission information of the application as being permitted to set the status of the application, if it is determined that the application is not in the predetermined list.

13. The non-transitory computer-readable medium according to claim 12, the method further comprising:
storing the status setting permission information of the application into a setting field of application information corresponding to the application.

14. The non-transitory computer-readable medium according to claim 11, the method further comprising:
receiving configuring information with respect to the application, the configuring information indicating whether it is permitted to set the status of the application; and
setting the status setting permission information of the application according to the received configuring information.

15. The non-transitory computer-readable medium according to claim 14, the method further comprising:
storing the status setting permission information of the application into a setting field of application information corresponding to the application.

* * * * *